US010357833B2

(12) United States Patent
Oh et al.

(10) Patent No.: US 10,357,833 B2
(45) Date of Patent: Jul. 23, 2019

(54) CUTTING INSERT AND CUTTING TOOL HAVING SAME MOUNTED THEREON

(71) Applicant: KORLOY INC., Seoul (KR)

(72) Inventors: Min Seok Oh, Cheongju-si (KR); Ki Chan Nam, Cheongju-si (KR); Tae Kyun Kim, Cheongju-si (KR); Nam Seon Lee, Cheongju-si (KR); Hyo San Kim, Cheongju-si (KR); Young Heum Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 0 days.

(21) Appl. No.: 15/755,785

(22) PCT Filed: Nov. 29, 2016

(86) PCT No.: PCT/KR2016/013826
§ 371 (c)(1),
(2) Date: Feb. 27, 2018

(87) PCT Pub. No.: WO2017/122926
PCT Pub. Date: Jul. 20, 2017

(65) Prior Publication Data
US 2019/0030628 A1    Jan. 31, 2019

(30) Foreign Application Priority Data

Jan. 12, 2016 (KR) .................. 10-2016-0003924

(51) Int. Cl.
*B23C 5/20* (2006.01)
*B23C 5/22* (2006.01)

(52) U.S. Cl.
CPC .............. *B23C 5/2221* (2013.01); *B23C 5/22* (2013.01); *B23C 2200/0438* (2013.01);
(Continued)

(58) Field of Classification Search
CPC .... B23C 5/20; B23C 5/22; B23C 5/10; B23C 5/2213; B23C 5/2221; B23C 2200/165; B23C 2200/16; B23C 2210/168
See application file for complete search history.

(56) References Cited

U.S. PATENT DOCUMENTS 6,913,426 B2 * 7/2005 Horiike ................. B23C 5/1045
407/113
7,802,944 B2 * 9/2010 Engstrom ............. B23C 5/2247
407/113
(Continued)

FOREIGN PATENT DOCUMENTS

KR    10-2002-0083423 A    11/2002

*Primary Examiner* — Willmon Fridie, Jr.
(74) *Attorney, Agent, or Firm* — Rabin & Berdo, P.C.

(57) ABSTRACT

The technical objective of the present invention is to provide a cutting insert that can minimize a phenomenon in which the cutting insert is lifted up from a seat surface of a cutting tool while a cutting process is being performed, and can increase an area by which the cutting insert is fastened to the cutting tool. To this end, the cutting insert of the present invention comprises: a principal surface; a fastening surface opposite to the principal surface, the fastening surface being placed on the seat surface of the cutting tool; and a screw passage hole formed through each of central portions of the principal and fastening surfaces, wherein a screw is fastened to the cutting tool through the screw passage hole; and first and second long grooves extending across the fastening surface, wherein each of the first and second long grooves includes: a proximal sidewall adjoining a first adjacent fastening portion of the fastening surface and making an acute angle with the first adjacent fastening portion; a distal sidewall adjoining a second adjacent fastening portion of the fastening surface and making an angle with the second adjacent fastening portion; and a ceiling wall connecting the proximal and distal sidewalls, wherein the proximal sidewall (Continued)

is located closer to the screw passage hole than the distal sidewall is located to the screw passage hole.

20 Claims, 14 Drawing Sheets

(52) U.S. Cl.
 CPC .. *B23C 2200/165* (2013.01); *B23C 2210/168* (2013.01); *B23C 2210/203* (2013.01)

(56) References Cited

U.S. PATENT DOCUMENTS

| | | | |
|---|---|---|---|
| 9,120,154 B2 * | 9/2015 | Hecht | B23B 27/1622 |
| 2002/0159846 A1 * | 10/2002 | Horiike | B23C 5/1045 |
| | | | 407/114 |
| 2003/0017014 A1 * | 1/2003 | Morgulis | B23C 5/109 |
| | | | 407/34 |
| 2006/0056926 A1 * | 3/2006 | Riviere | B23C 5/1045 |
| | | | 407/40 |
| 2006/0056928 A1 * | 3/2006 | Riviere | B23C 5/1045 |
| | | | 407/113 |

* cited by examiner

Prior Art

CUTTING INSERT AND CUTTING TOOL HAVING SAME MOUNTED THEREON

TECHNICAL FIELD

The present disclosure relates to a cutting insert and a cutting tool having the same mounted thereon.

BACKGROUND ART

Generally, a cutting insert is fastened to a cutting tool mounted on a machine tool and is used for cutting a workpiece made of iron, non-ferrous metal, non-metal material, and so on.

Such cutting insert typically has a principal surface, a fastening surface, and a plurality of side surfaces connecting the principal surface and the fastening surface. A cutting edge is provided between the side surface and the principal surface.

FIG. 1 is a cross-sectional view illustrating a related cutting insert mounted on a fastening surface of a cutting tool, taken elsewhere from a clamping screw and a bore, FIG. 2 is a bottom perspective view of the cutting insert of FIG. 1, FIG. 3 is a top view of the lower wall of the cutting tool of FIG. 1, and FIG. 4 is a side view of the cutting tool of FIG. 1.

As shown in FIGS. 1 to 3, an example of the related technology can be found in the cutting insert 14 disclosed in Korean Patent No. 10-0830323, which is provided with two parallel grooves 74 that are formed side by side on a bottom surface (i.e., fastening surface) 60 of the cutting insert 14 and that are respectively engaged with the front protrusion 40 and the rear protrusion 42 protruding from the lower wall 26 of a cutting tool 12. Specifically, each of these two grooves 74 includes a distal sidewall 76 perpendicular to the bottom surface 60, a proximal sidewall 78 that is inclined with respect to the bottom surface 60 and adjacent to the bore 36 of the cutting tool 12 closer than the distal sidewall 76, and an upper surface 80 that connects the proximal sidewall 78 to the distal sidewall 76 and is parallel with respect to the bottom surface 60, as shown in FIGS. 1 and 2.

Accordingly, as shown in FIG. 1, the protrusions 40, 42 of the insert receiving pocket 16 are engaged with the corresponding grooves 74 in the bottom surface 60 of the cutting insert. However, due to the tolerances, only one side of the protrusions 40, 42 is in contact with the cutting insert 14 during cutting process. That is, while the distal cutting edge of the cutting insert 14 is pressing on and cutting the workpiece in the direction of the rotational axis (A in FIG. 4) of the cutting tool 12, the front surface 46 of the front protrusion 40 is brought into contact with the front distal sidewall 76 of the front groove 74 to support the force exerted on the cutting insert 14.

However, since the related cutting insert 14 described above has a distal sidewall 76 perpendicular to the bottom surface 60 which is in contact with the front surface 46 of the front protrusion 40 perpendicular to the lower wall (i.e., seat surface) 26 of the cutting tool 12 (46), considering that the lower wall 26 of the cutting tool is inclined by "α" with respect to the rotational axis A as shown in FIG. 4, when a force is exerted to the cutting insert 14 in the direction of the rotational axis A, there is a problem that the cutting insert 14 is lifted up from the lower wall 26 of the cutting tool as the distal sidewall 76 is moved along the front surface 46 of the front protrusion 40.

In another example of the related technology that can be found in the cutting tool 12 disclosed in Korean Patent No. 10-0830323, the cutting tool 12 includes a front protrusion 40 and a rear protrusion 42 protruding from the lower wall 26, as shown in FIG. 3. Specifically, as shown in FIG. 3, each of these two protrusions 40, 42 has a length spanning from the outside of the lower wall 26 to the center of the bore 36.

That is, while the distal cutting edge of the cutting insert 14 is pressing on and cutting the workpiece in the direction of the rotational axis (A in FIG. 4) of the cutting tool 12, the front surface 46 of the front protrusion 40 is in contact with the front distal sidewall 76 of the front groove 74 to support the force exerted on the cutting insert 14.

However, in the related cutting tool 12, since each of the protrusions 40, 42 is extended only up to the center of the bore, while the cutting tool 12 is being transferred in a direction perpendicular to its rotational axis (A of FIG. 4), there is a problem that the cutting insert 14 is rotated about the bore 36 by the radial load generated from the side cutting edge of the cutting insert 14 pressing on the workpiece.

SUMMARY

Technical Problem

The technical objective of the present invention is to provide a cutting insert that can minimize a phenomenon in which the cutting insert is lifted up from a seat surface of a cutting tool while a cutting process is being performed, and that can increase an area by which the cutting insert is fastened to the cutting tool, and the cutting tool having the same mounted thereon.

Another technical objective is to provide a cutting tool that can minimize the phenomenon in which the cutting insert is rotated about the screw passage hole during the cutting process.

Technical Solution

In order to achieve the above object, a cutting insert according to an embodiment of the present disclosure is provided, which may include a principal surface; a fastening surface opposite to the principal surface, the fastening surface being placed on the seat surface of a cutting tool; a screw passage hole formed through each of central portions of the principal and fastening surfaces, in which a screw is fastened to the cutting tool through the screw passage hole for fastening with the cutting tool; and first and second long grooves extending across the fastening surface, in which each of the first and second long grooves may include: a proximal sidewall adjoining a first adjacent fastening portion of the fastening surface and making an acute angle with the first adjacent fastening portion; a distal sidewall adjoining a second adjacent fastening portion of the fastening surface and making an angle with the second adjacent fastening portion; and a ceiling wall connecting the proximal and distal sidewalls, in which the proximal sidewall is located to be closer to the screw passage hole than the distal sidewall is located to the screw passage hole.

The first and second long grooves may be parallel to each other.

The cutting insert may further include first and second long side surfaces and first and second short side surfaces connecting the principal surface and the fastening surface. The first and second long side surfaces may be opposed to each other, and the first and second short side surfaces may be opposed to each other. Each of the first and second long grooves may be formed in a manner such that one end thereof is exposed to the first long side surface, and the other end thereof is exposed to the second long side surface.

In one example, each of the first and second long grooves may be inclined with respect to a longitudinal centerline of the fastening surface.

In another example, each of the first and second long grooves may be perpendicular to the longitudinal centerline of the fastening surface.

Meanwhile, a cutting tool according to an embodiment of the present disclosure may have the cutting insert described above according to the embodiment of the present disclosure mounted thereon, and may include: a seat surface on which the fastening surface is placed; a screw fastening hole formed on the seat surface and through which the screw is screwed; and a front protrusion and a rear protrusion protruding from the seat surface and being inserted into the first and second long grooves, respectively, in which each of the front protrusion and the rear protrusion may include: a front surface contacting the first adjacent seat portion of the seat surface and making an angle with the first adjacent seat portion; a rear surface contacting the second adjacent seat portion of the seat surface and making an acute angle with the second adjacent seat portion; and an upper surface connecting the front surface and the rear surface, in which the rear surface is located to be closer to the screw fastening hole than the front surface is located to the screw fastening hole.

The rear protrusion may be located to be farther away from the end of the cutting tool than the front protrusion is located away from the end of the cutting tool, and one end of the rear surface of the rear protrusion may be at a farthest distance in the seat surface away from the rotational axis of the cutting tool, and the other end thereof may be between an imaginary line and a portion in the seat surface that is closest to the rotational axis, in which the imaginary line may be an imaginary line that is passed through an edge of the screw fastening hole that is closest to the rotational axis, and that is parallel to the rotational axis.

The rear surface of the rear protrusion may be in contact with the proximal sidewall of the second long groove of the cutting insert during the cutting process.

On the other hand, a cutting insert according to another embodiment of the present disclosure may provide a cutting insert, which may include a principal surface; a fastening surface opposite to the principal surface, the fastening surface for fastening with a seat surface of a cutting tool; a screw passage hole formed through each of central portions of the principal and fastening surfaces, in which a screw is fastened to the cutting tool through the screw passage hole for fastening with the cutting tool; and a long groove elongated across the fastening surface, in which the long groove may include: a first sidewall adjoining a first adjacent fastening portion of the fastening surface and making an acute angle with the first adjacent fastening portion; a second sidewall adjoining a second adjacent fastening portion of the fastening surface and making an acute angle with the second adjacent fastening portion; and a ceiling wall connecting the first sidewall and the second sidewall, in which a center of the long groove may be placed in the screw passage hole.

In one example, the cutting insert may further include first and second long side surfaces and first and second short side surfaces connecting the principal surface and the fastening surface. The first and second long side surfaces may be opposed to each other, and the first and second short side surfaces may be opposed to each other. The long groove may be formed in a manner such that one end thereof is exposed to the first long side surface and the other end is exposed to the second long side surface, and may be inclined to a longitudinal centerline of the fastening surface.

In another example, the cutting insert may further include first and second long side surfaces and first and second short side surfaces connecting the principal surface and the fastening surface, and the first and second long side surfaces may be opposed to each other, and the first and second short side surfaces may be opposed to each other. The long groove may be formed in a manner such that one end thereof is exposed to the first long side surface and the other end is exposed to the second long side surface, and may be perpendicular to a longitudinal centerline of the fastening surface.

Meanwhile, a cutting tool according to another embodiment of the present disclosure may have the cutting insert described above according to another embodiment of the present disclosure mounted thereon, and may include: a seat surface on which the fastening surface is placed; a screw fastening hole formed on the seat surface; and a protrusion protruding from the seat surface and being inserted into the long groove, in which the protrusion may include a first surface adjoining the first adjacent seat portion of the seat surface and making an acute angle with the first adjacent seat portion; a second surface adjoining the second adjacent seat portion of the seat surface and making an acute angle with the second adjacent seat portion; and an upper surface connecting the first surface and the second surface, in which the first and second surfaces may be in a bilateral symmetry with each other with respect to a center of the screw fastening hole.

The first surface may be placed closer to the end of the cutting tool than the second surface is placed to an end of the cutting tool, and one end of the first surface may be at a farthest distance in the seat surface away from the rotational axis of the cutting tool, and the other end of the first surface may be between an imaginary line and a portion in the seat surface that is closest to the rotational axis, in which the imaginary line may be an imaginary line that is passed through an edge of the screw fastening hole that is closest to the rotational axis, and that is parallel to the rotational axis.

The first sidewall may be located closer to the end of the cutting tool than the second sidewall is located to the end of the cutting tool, and the first surface may be in contact with the first sidewall of the long groove of the cutting insert during the cutting process.

Meanwhile, a cutting tool according to another embodiment of the present disclosure may include: a seat surface on which a fastening surface of a cutting insert is placed; a screw fastening hole formed on the seat surface and through which a screw is screwed; and a protrusion protruding from the seat surface, in which the protrusion may include: a first surface making an angle with respect to the seat surface; a second surface making an angle with respect to the seat surface; and an upper surface connecting the first surface and the second surface, in which the first surface may be placed closer to the end of the cutting tool than the second surface is placed to the end of the cutting tool, and one end of the first surface may be at a farthest distance in the seat surface away from the rotational axis of the cutting tool, and the other end of the first surface may be between an imaginary line and a portion in the seat surface closest to the rotational axis, in which the imaginary line may be an imaginary line that is passed through an edge of the screw fastening hole that is closest to the rotational axis, and that is parallel to the rotational axis.

Advantageous Effects

The present disclosure gives the following effects. As described above, the cutting insert and the cutting tool having the cutting insert mounted thereon according to the embodiments of the present disclosure may have the following effects.

According to the embodiments of the present disclosure, among the proximal sidewall and the distal sidewall of the long groove, the proximal sidewall is located to be closer to the screw passage hole of the proximal sidewall than the distal sidewall and makes an acute angle with the first adjacent fastening portion of the fastening surface in contact therewith. Accordingly, when the rear surface of the rear protrusion protruding from the seat surface of the cutting tool is formed so as to correspond to the proximal sidewall, while the cutting insert mounted on the cutting tool is subject to a force in the rotational axis direction of the cutting tool, it is possible to minimize the phenomenon in which the cutting insert is lifted up from the seat surface of the cutting tool, because the proximal sidewall rides more securely along the rear surface of the rear protruding portion and brought into contact therewith. In addition, since the proximal sidewall making an acute angle with the first adjacent fastening portion of the fastening surface results in an increased area than the related case in which the proximal sidewall makes right angles, the frictional force between the cutting insert and the cutting tool can be increased due to the increased area of fastening between the cutting insert and the cutting tool, and accordingly, the fastening force is improved.

Further, according to the embodiments of the present disclosure, among the front protrusion and the rear protrusion, the rear surface of the rear protrusion is located farther away from the end of the cutting tool, with one end of the rear surface of the rear protrusion being at a farthest distance in the seat surface away from the rotational axis of the cutting tool, and the other end being is between an imaginary line and a portion in the seat surface that is closest to the rotational axis, and with the imaginary line passing through an edge of the screw fastening hole that is closest to the rotational axis and being parallel to the rotational axis. Accordingly, while the cutting tool is being transferred in the direction perpendicular to the rotational axis, even when a radial load (i.e., feed force) generated from the side cutting edge of the cutting insert pressing the workpiece is exerted to the cutting insert, it is possible to minimize the phenomenon in which the cutting insert is rotated around the screw passage hole.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 10 illustrates a state in which the cutting tool of FIG. 8 is transferred in a direction perpendicular to the rotational axis, during which feed force is exerted to the cutting insert, and in which FIG. 10a illustrates the cutting insert being rotated when the length of the protrusion is short, and FIG. 10b illustrates the cutting insert being not rotated when the length of the protrusion is relatively long;

BEST MODE

Hereinafter, preferred embodiments of the present disclosure will be described in detail with reference to the accompanying drawings. However, the description proposed herein is just a preferable example for the purpose of illustrations only, and not intended to limit the scope of the disclosure, so it should be understood that other equivalents and modifications could be made thereto without departing from the scope of the disclosure.

Figure 1:
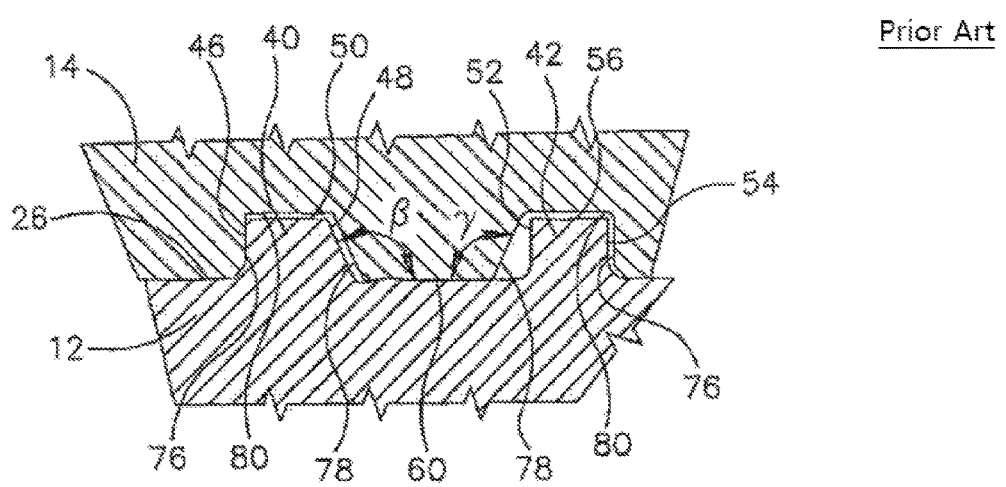
FIG. 1 is a cross-sectional view illustrating a related cutting insert mounted on a fastening surface of a cutting tool, taken elsewhere from a clamping screw and a bore.
Figure 2:
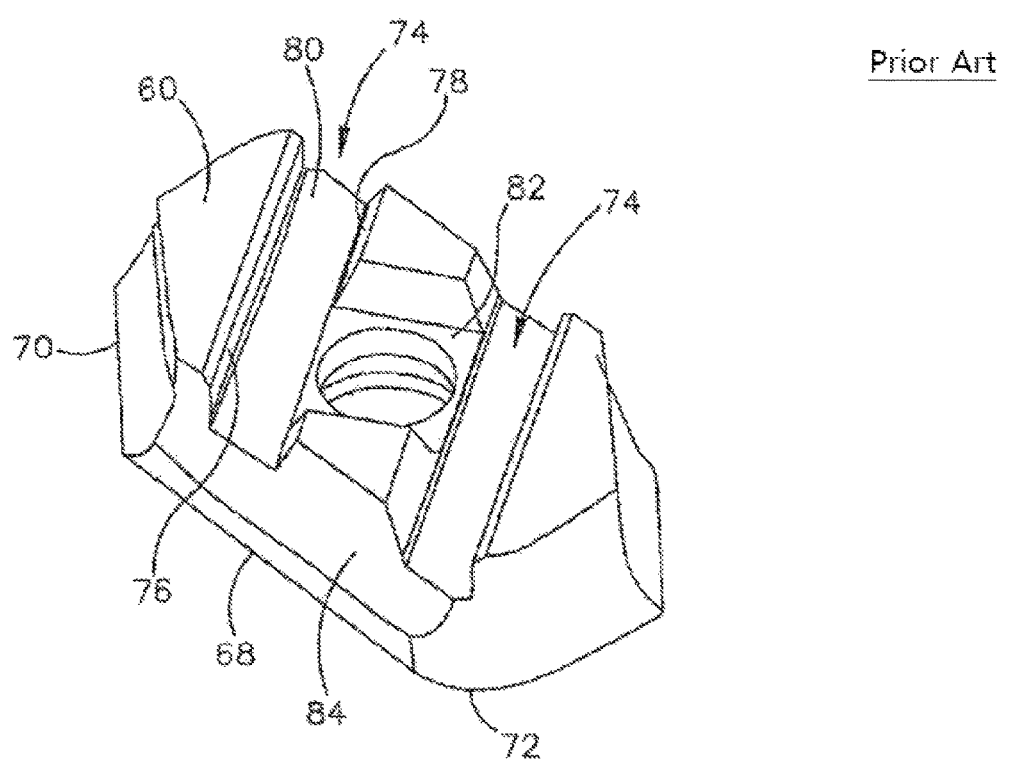
FIG. 2 is a bottom perspective view of the cutting insert of FIG. 1.
Figure 3:
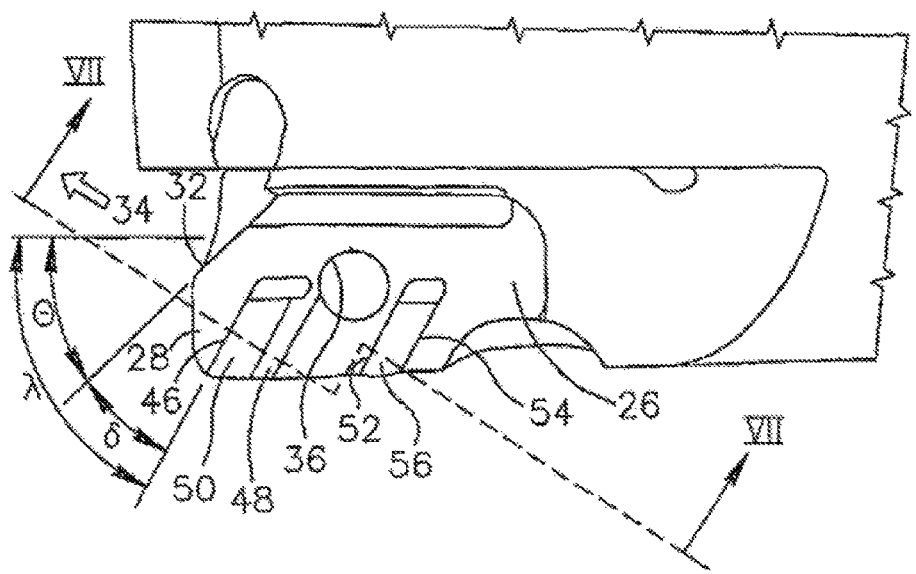
FIG. 3 is a top view of the lower wall of the cutting tool of FIG. 1.
Figure 4:
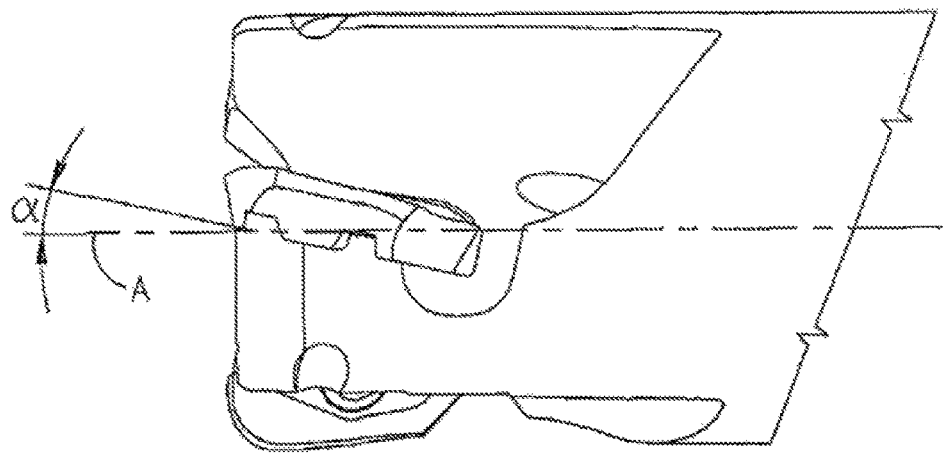
FIG. 4 is a side view of the cutting tool of FIG. 1.
Figure 5:
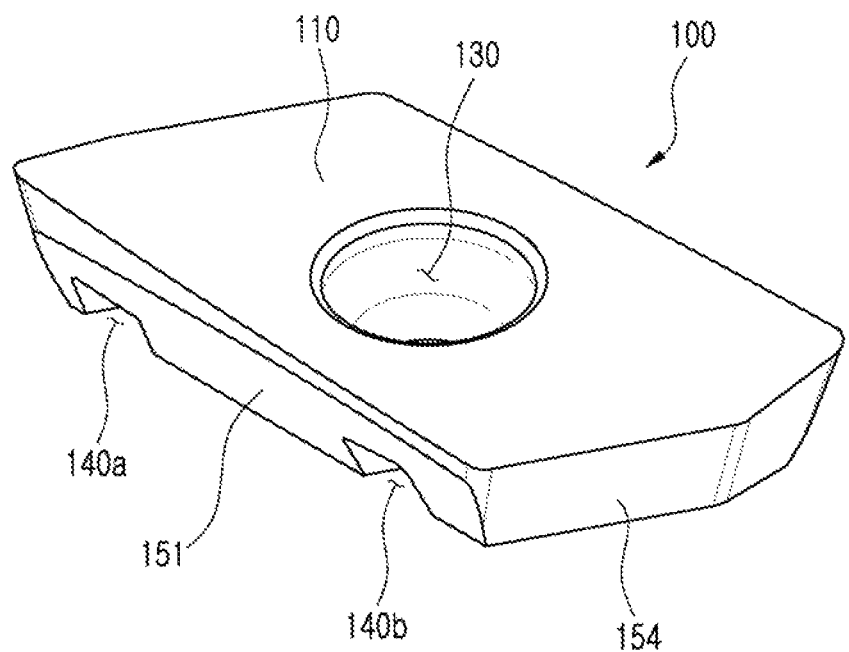
FIG. 5 is a perspective view schematically illustrating a cutting insert according to a first embodiment of the present disclosure.
Figure 6:
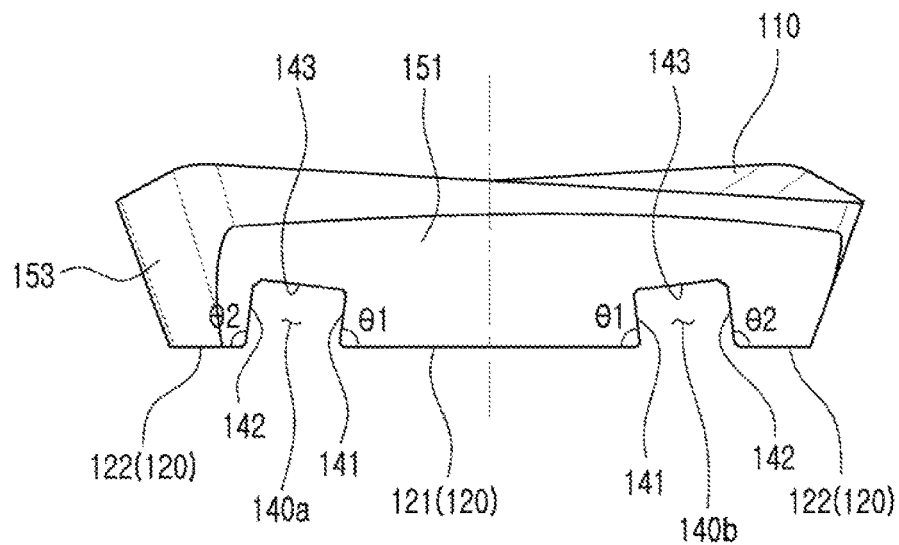
FIG. 6 is a side view of the cutting insert of FIG. 5 viewed in a longitudinal direction of the first and second long grooves.
Figure 7:
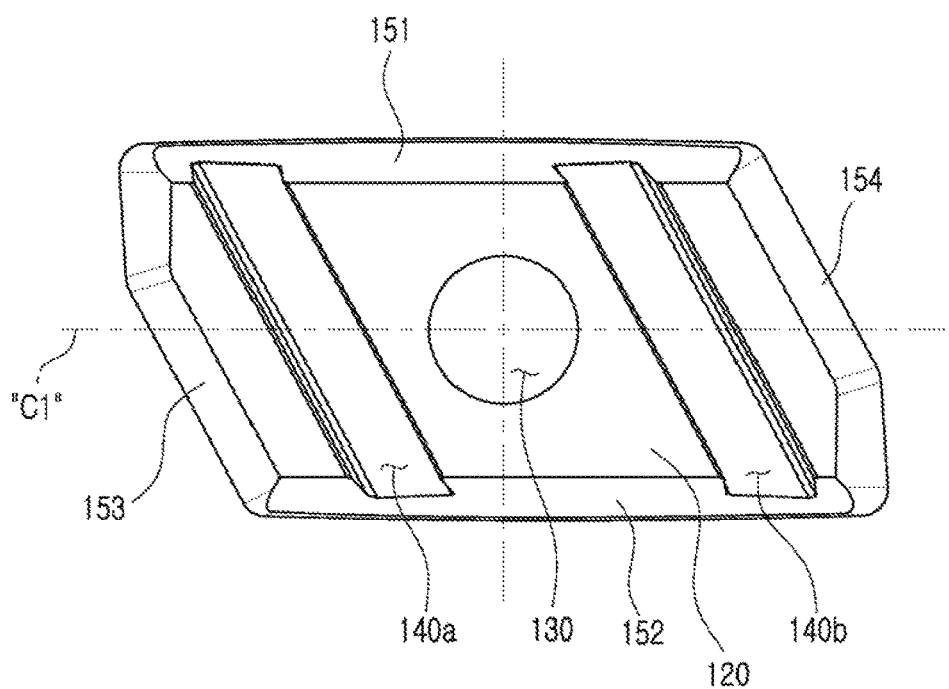
FIG. 7 is a bottom view of the cutting insert of FIG. 5.

FIG. 5 is a perspective view schematically illustrating a cutting insert according to a first embodiment of the present disclosure, FIG. 6 is a side view of the cutting insert of FIG. 5 viewed in a longitudinal direction of the first and second long grooves, and FIG. 7 is a bottom view of the cutting insert of FIG. 5.

Figure 8:
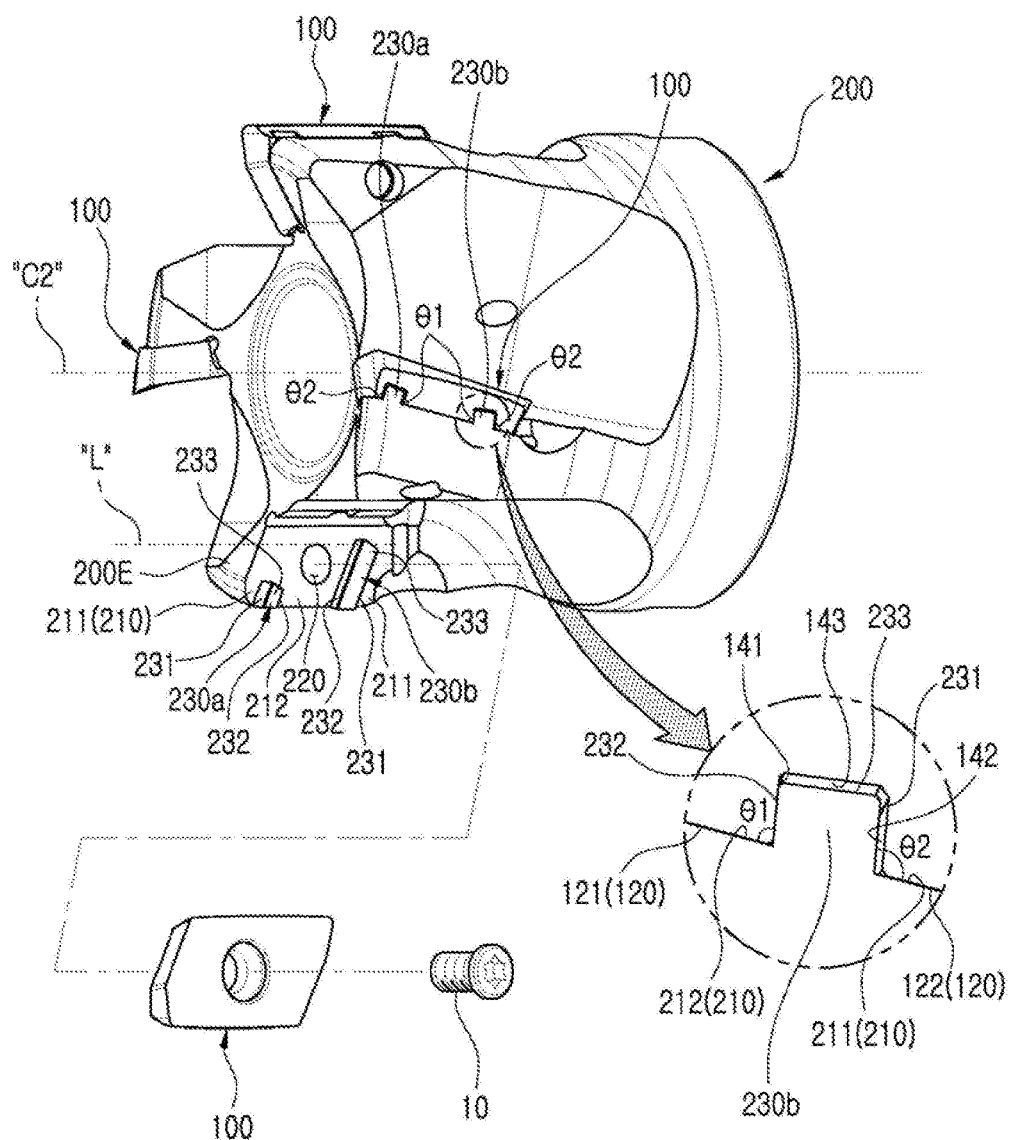
FIG. 8 is a perspective view schematically illustrating a cutting tool having the cutting insert of FIG. 5 mounted thereon.
Figure 9:
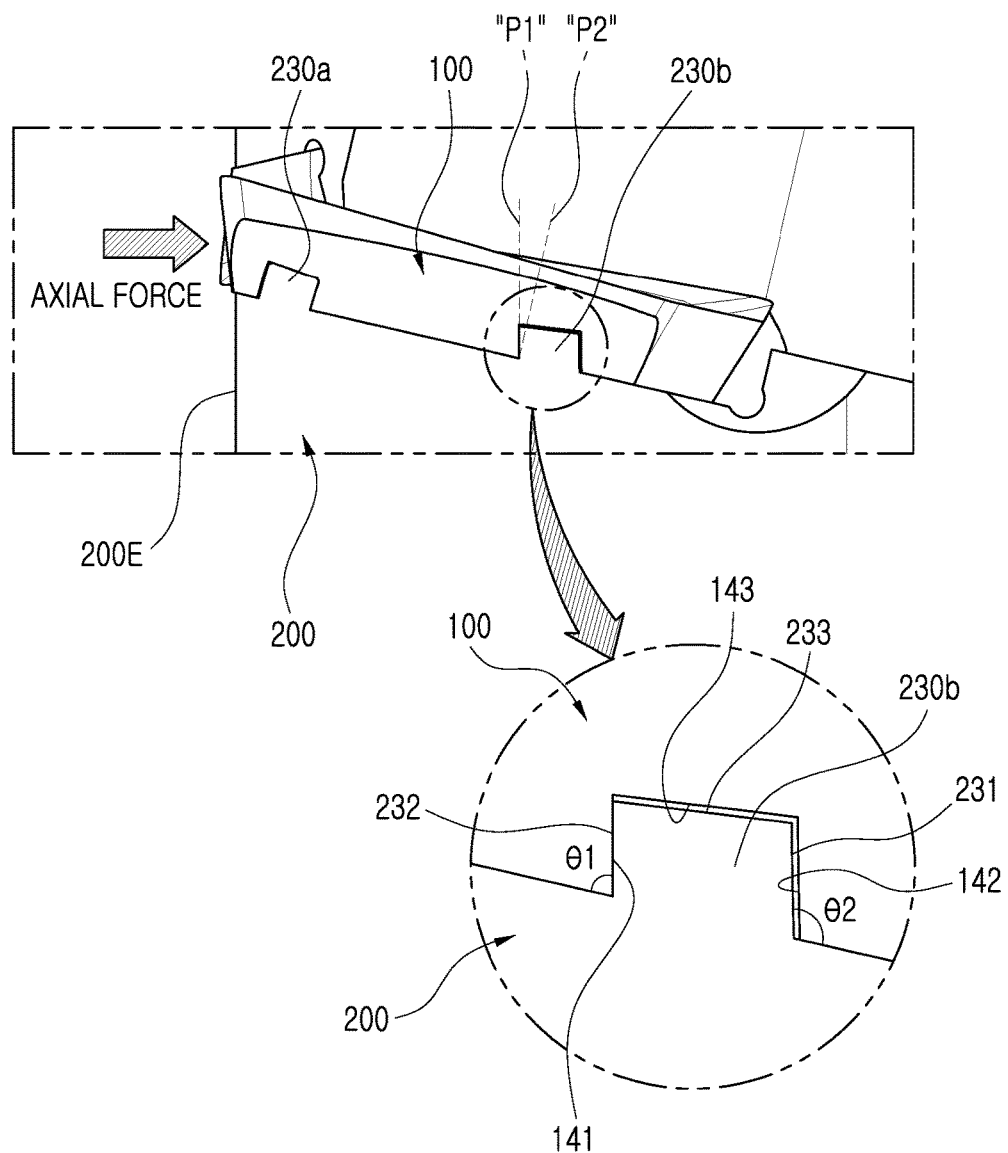
FIG. 9 illustrates a state in which the cutting insert mounted on the cutting tool of FIG. 8 is in contact with the cutting tool under a force in the rotational axis direction of the cutting tool.

FIG. 8 is a perspective view schematically illustrating a cutting tool having the cutting insert of FIG. 5 mounted thereon, and FIG. 9 illustrates a state in which the cutting insert mounted on the cutting tool of FIG. 8 is in contact with the cutting tool under a force in the rotational axis direction of the cutting tool.

As shown in FIGS. 5 to 7, the cutting insert 100 according to the first embodiment of the present disclosure includes: a principal surface 110; a fastening surface 120 opposite to the principal surface 110, the fastening surface 120 for fastening with a seat surface 210 (FIG. 8) of the cutting tool 200 (FIG. 8); and a screw passage hole 130 formed through each of central portions of the principal and fastening surfaces 110, 120, in which a screw 10 (FIG. 8) is fastened to the cutting tool through the screw passage hole 130 for fastening with the cutting tool 200 (FIG. 8). Hereinafter, the first and second long grooves 140a, 140b will be described in detail with reference to FIGS. 5 to 7.

Each of the first and second long grooves 140a, 140b includes a proximal sidewall 141, a distal sidewall 142, and a ceiling wall 143. The proximal sidewall 141 adjoins the first adjacent fastening portion 121 of the fastening surface 120 and makes an acute angle θ1 with the first adjacent fastening portion 121 and the distal sidewall 142 adjoins the second fastening portion 122 of the fastening surface 120 and makes an angle (for example, obtuse angle (θ2)) with the second adjacent fastening portion 122, and the ceiling wall 143 connects the proximal sidewall 141 and the distal sidewall 142. Specifically, the proximal sidewall 141 is located closer to the screw passage hole 130 than the distal sidewall 142 is located to the screw passage hole 130.

Accordingly, among the proximal sidewall 141 and the distal sidewall 142 respectively included in the first and second long grooves 140a, 140b, the proximal sidewall 141 is located to be closer to the screw passage hole 130 than the distal sidewall 142 is located to the screw passage hole 130 and makes an acute angle with the first adjacent fastening portion 121 in adjoining therewith. Accordingly, when the rear surface 232 (FIG. 8) of the rear protruding portion 230b (FIG. 8) protruding from the seat surface 210 (FIG. 8) of the cutting tool 200 (FIG. 8) is formed so as to correspond to the proximal sidewall 141, as shown in FIG. 9, while the cutting insert 100 mounted on the cutting tool 200 (FIG. 8) is subject to an axial force of the rotational axis C2 of the cutting tool, the proximal sidewall 141 rides more securely along the rear surface 232 (FIG. 8) of the rear protruding portion 230b (FIG. 8) and brought into contact therewith. It is thus possible to minimize the phenomenon in which the cutting insert 100 is lifted up from the seat surface 210 (FIG. 8) of the cutting tool 200 (FIG. 8), and together with the above, the proximal sidewall 141 making an acute angle with the first adjacent fastening portion 121 of the fastening surface 120 (see P1 of FIG. 9) has a larger area than that of the proximal sidewall making right angles in the related art (see P2 of FIG. 9), and the increased fastening area between the cutting insert and the cutting tool can lead into increased frictional force between the cutting insert and the cutting tool, ultimately resulting in improved fastening force.

Further, as shown in FIG. 7, the first and second long grooves 140a, 140b may be parallel to each other. Accordingly, when the first and second long grooves 140a, 140b are at an equal distance from each other from the screw passage hole 130 with the screw passage hole 130 in the center, even when the cutting insert 100 is rotated 180 degrees with respect to the screw passage hole 130, the first and second long grooves 140a, 140b are mounted on the front and rear protrusions 230a, 230b of the cutting tool 200 to be described below, respectively, and as a result, it is possible to use another cutting edge of the cutting insert 100 that is in the diagonal direction.

In addition, as shown in FIG. 7, the cutting insert 100 according to the first embodiment described above may further include first and second long side surfaces 151, 152 and first and second short side surfaces 153, 154 connecting the principal surface 110 and the fastening surface 120. The first and second long side surfaces 151, 152 may be opposed to each other and the first and second short side surfaces 153, 154 may be opposed to each other. In this case, each of the first and second long grooves 140a, 140b may be formed in a manner such that one end thereof is exposed to the first long side surface 151 and the other end thereof is exposed to the second long side surface 152. Accordingly, it is possible to push the cutting insert 100 in the side surface direction thereof until the first and second long grooves 140a, 140b of the cutting insert 100 are respectively fitted with the front and rear protrusions 140a, 140b of the cutting tool 200 to be described later.

In addition, as shown in FIG. 7, each of the first and second long grooves 140a, 140b may be inclined with respect to the longitudinal centerline C1 of the fastening surface 120.

Hereinafter, a cutting tool 200 according to an embodiment of the present disclosure will be described with reference to FIGS. 8 to 10.

Figure 10:
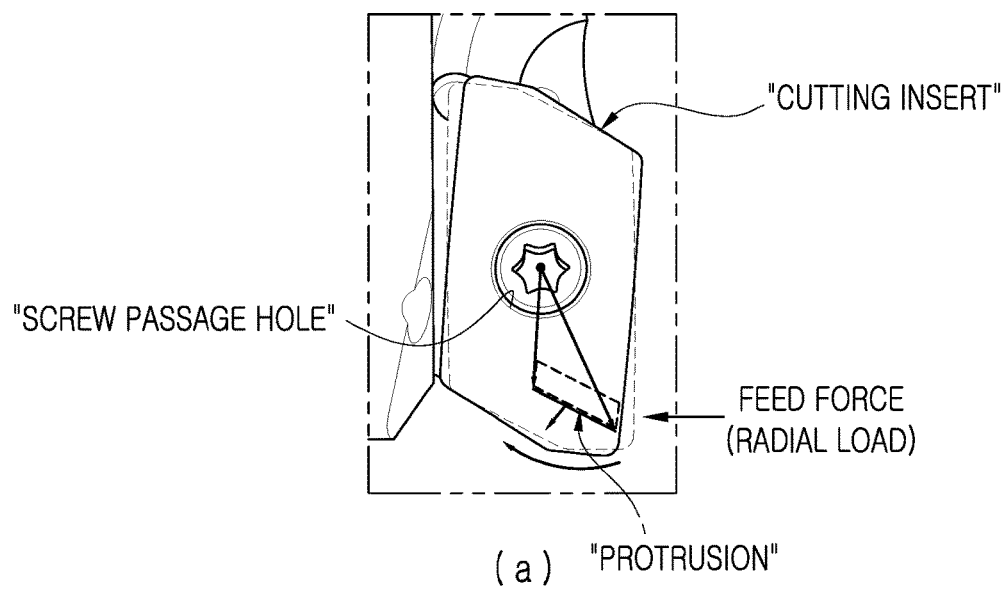
Figure 10:
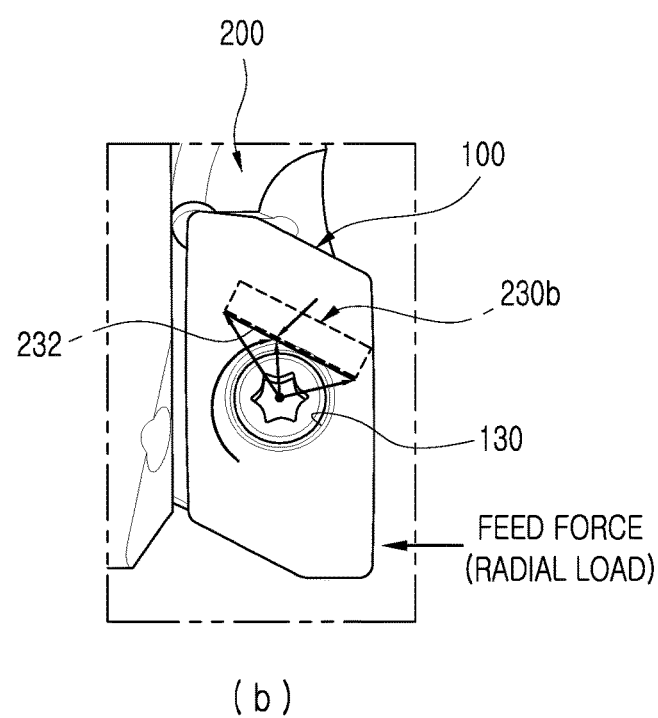

FIG. 10 illustrates a state in which the cutting tool of FIG. 8 is transferred in a direction perpendicular to the rotational axis, during which feed force is exerted to the cutting insert, and in which FIG. 10a illustrates the cutting insert being rotated when the length of the protrusion is short, and FIG. 10b illustrates the cutting insert being not rotated when the length of the protrusion is relatively long.

A cutting tool 200 according to an embodiment of the present disclosure has the cutting insert 100 according to the first embodiment of the present disclosure mounted thereon, and includes a seat surface 210, a screw fastening hole 220, a front protrusion 230a, and a rear protrusion 230b. Hereinafter, still referring to FIGS. 8 and 9, the respective elements will be described in detail.

The seat surface 210 is provided so that the fastening surface 120 of the cutting insert 100 described above is placed thereon, as shown in FIGS. 8 and 9. The seat surface 210 is inclined at a predetermined angle with respect to the rotational axis C2 of the cutting tool 200.

As shown in FIG. 8, the screw fastening hole 220 is provided to be fastened with the screw 10 that has passed through the screw passage hole 130 of the cutting insert 100 described above. A thread is formed on the inner circumferential surface of the screw fastening hole 220 such that the screw 10 is fastened in a screw-coupling manner.

As shown in FIG. 8, the front and rear protrusions 230a, 230b are protruded from the seat surface 210 and inserted into the first and second long grooves 140a, 140b of the cutting insert 100, respectively. Specifically, as shown in FIG. 8, each of the front and rear protrusions 230a, 230b includes a front surface 231, a rear surface 232, and an upper surface 233. The front surface 231 adjoins the first adjacent seat portion 211 of the seat surface 210 and makes an angle (for example, obtuse angle (θ2)) with the first adjacent seat portion 211, and the rear surface 232 adjoins the second adjacent seat portion 212 and makes an acute angle with the second adjacent seat portion 211, and the upper surface 233 connects the front surface 231 and the rear surface 233. In addition, the rear surface 232 is located to be closer to the screw fastening hole 220 than the front surface 231 is located to the screw fastening hole 220.

Accordingly, with the technical configuration is provided herein, in which the rear surface 232 of the rear protrusion 230b protruding from the seat surface 210 of the cutting tool 200 makes an acute angle θ1 with the second adjacent seat portion 212 in contact therewith, when the proximal sidewall 141 of the cutting insert 100 described above is formed to correspond to the rear surface 232, as shown in FIG. 9, while the cutting insert 100 mounted on the cutting tool 200 is subject to an axial force of the rotational axis C2 of the cutting tool, the proximal sidewall 141 rides more securely on the rear surface 232 of the rear protruding portion 230b and brought into contact therewith, and as a result, it is possible to minimize the phenomenon in which the cutting insert 100 is lifted up from the seat surface 210 of the cutting tool 200, and together with the above, the proximal sidewall 141 making an acute angle with the first adjacent fastening portion 121 of the fastening surface 120 (see P1 of FIG. 9) has a larger area than that of the proximal sidewall making right angles in the related art (see P2 of FIG. 9), and as a result, the increased fastening area between the cutting insert and the cutting tool can lead into increased frictional force between the cutting insert and the cutting tool, ultimately resulting in improved fastening force.

As shown in FIG. 8, the rear protrusion 230b may be located to be farther away from the end 200E of the cutting tool 200 than the front protrusion 230a, and one end of the rear surface 232 of the rear protrusion 230b in the seat surface 210 may be at a farthest distance from the rotational axis C2 of the cutting tool 200, and the other end of the rear surface 232 of the rear protrusion 230b in the seat surface 210 may be between the rotational axis C2 and an imaginary line L. The 'imaginary line L' herein refers to an imaginary line that is passed through an edge of the screw fastening hole 220 closest to the rotational axis C2 and that is parallel to the rotational axis C2.

Accordingly, with the technical configuration provided herein, in which, among the front protrusion 230a and the rear protrusion 230b, one end of the rear surface of the rear protrusion that is located in the seat surface 210 farther away from the end of the cutting tool 230 is at a farthest distance away from the rotational axis C2 of the cutting tool 200, and the other end thereof is between an imaginary line L and the portion in the seat surface 210 that is closest to the rotational axis C2. Accordingly, as shown in FIG. 10b, while the cutting tool is being transferred in the direction perpendicular to the rotational axis C2, even when a radial load (i.e., feed force) generated from the side cutting edge of the cutting insert 100 pressing the workpiece is exerted to the cutting insert 100, it is possible to minimize the phenomenon in which the cutting insert 100 is rotated around the screw passage hole 130.

Further, as shown in FIG. 9, the rear surface 232 of the rear protrusion 230b may be in contact with the proximal sidewall 141 of the second long groove 140b of the cutting insert 100 during the cutting process. Accordingly, the feed force described above can be supported by the rear surface 232 of the rear protrusion 230b and the proximal sidewall 141 of the second long groove 140b.

Hereinafter, a cutting insert 2100 according to a second embodiment of the present disclosure will be described with reference to FIGS. 11 and 12.

Figure 11:
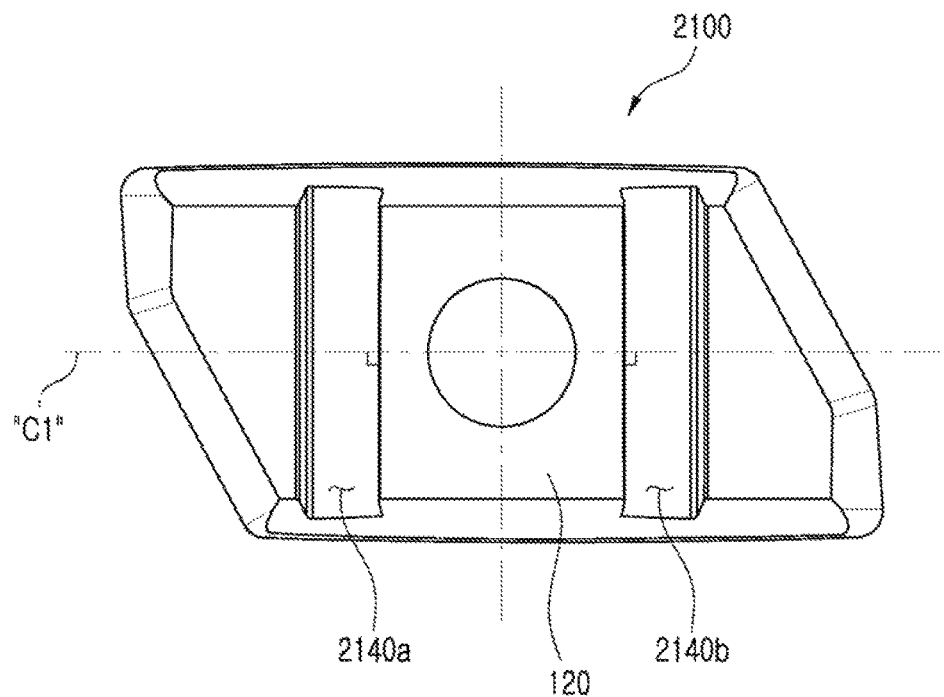
FIG. 11 is a bottom view schematically illustrating a cutting insert according to a second embodiment of the present disclosure.
Figure 12:
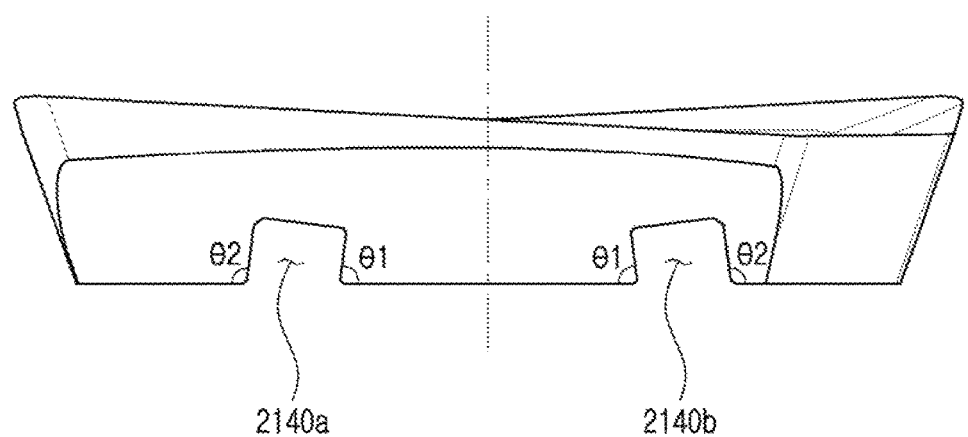
FIG. 12 is a side view of the cutting insert of FIG. 11 viewed in a longitudinal direction of the first and second long grooves.

FIG. 11 is a bottom view schematically illustrating a cutting insert according to a second embodiment of the present disclosure, and FIG. 12 is a side view of the cutting insert of FIG. 11 viewed in a longitudinal direction of the first and second long grooves.

As shown in FIGS. 11 and 12, since the cutting insert 2100 according to the second embodiment of the present disclosure is the same as the first embodiment of the present disclosure described above except for the form in which the first and second long grooves 2140a, 2140b are disposed, the following discussions will be focused mainly on the form in which the first and second long grooves 2140a, 2140b are disposed.

As shown in FIG. 11, each of the first and second long grooves 2140a, 2140b may be perpendicular to the longitudinal centerline Cl of the fastening surface 120.

Hereinafter, a cutting insert 3100 according to the third embodiment of the present disclosure will be described with reference to FIGS. 13 and 14.

Figure 13:
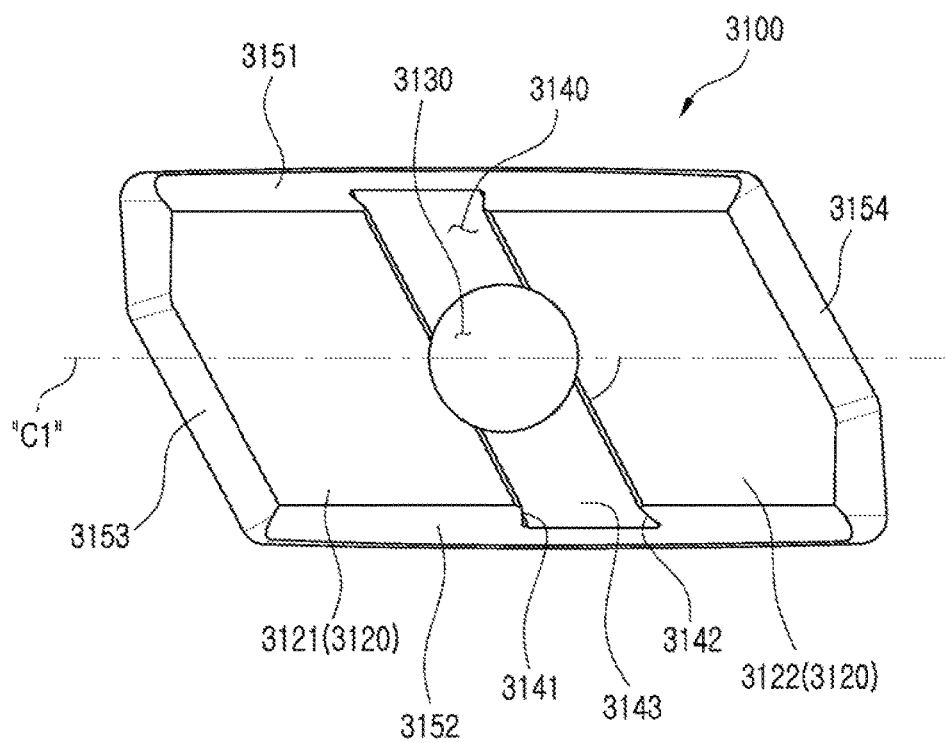
FIG. 13 is a bottom view schematically illustrating a cutting insert according to a third embodiment of the present disclosure.
Figure 14:
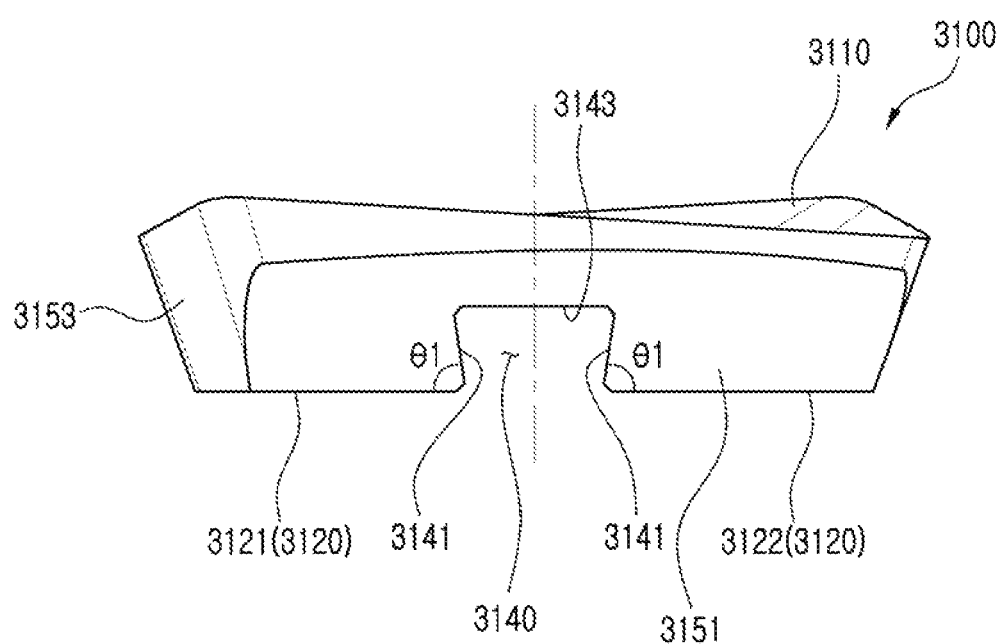
FIG. 14 is a side view of the cutting insert of FIG. 13 viewed in a longitudinal direction of the long groove.

FIG. 13 is a bottom view schematically illustrating a cutting insert according to the third embodiment of the present disclosure, and FIG. 14 is a side view of the cutting insert of FIG. 13 viewed in the longitudinal direction of the long groove.

As shown in FIGS. 13 and 14, since the cutting insert 3100 according to the third embodiment of the present disclosure is the same as the first embodiment of the present disclosure described above except that one long groove 3140 is disposed, the following discussions will be focused mainly on the long groove 3140.

As shown in FIG. 14, the long groove 3140 includes a first sidewall 3141, a second sidewall 3142, and a ceiling wall 3143. The first sidewall 3141 adjoins the first adjacent fastening portion 3121 of the fastening surface 3120 and makes an acute angle θ1 with the first adjacent fastening portion 3121, the second sidewall 3142 adjoins the second adjacent fastening portion 3122 of the fastening surface 3120 and makes an acute angle θ1 with the second adjacent fastening portion 3122, and the ceiling wall 3143 connects the first sidewall 3141 and the second sidewall 3142. Specifically, the center of the long groove 3140 may be placed in the screw passage hole 3130.

More specifically, the cutting insert 3100 according to the third embodiment of the present disclosure may further include first and second long side surfaces 3151, 3152 and first and second short side surfaces 3153, 3154 connecting the principal surface 3110 and the fastening surface 3120. In this case, the first and second long side surfaces 3151, 3152 may be opposed to each other and the first and second short side surfaces 3153, 3154 may be opposed to each other. The long groove 3140 may be formed in a manner such that one end thereof is exposed to the first long side surface 3151 and the other end thereof is exposed to second long side surface 3152. In addition, the long groove 3140 may be inclined with respect to the longitudinal centerline C1 of the fastening surface 3120.

Hereinafter, a cutting tool 2200 according to another embodiment of the present disclosure will be described with reference to FIG. 15.

Figure 15:
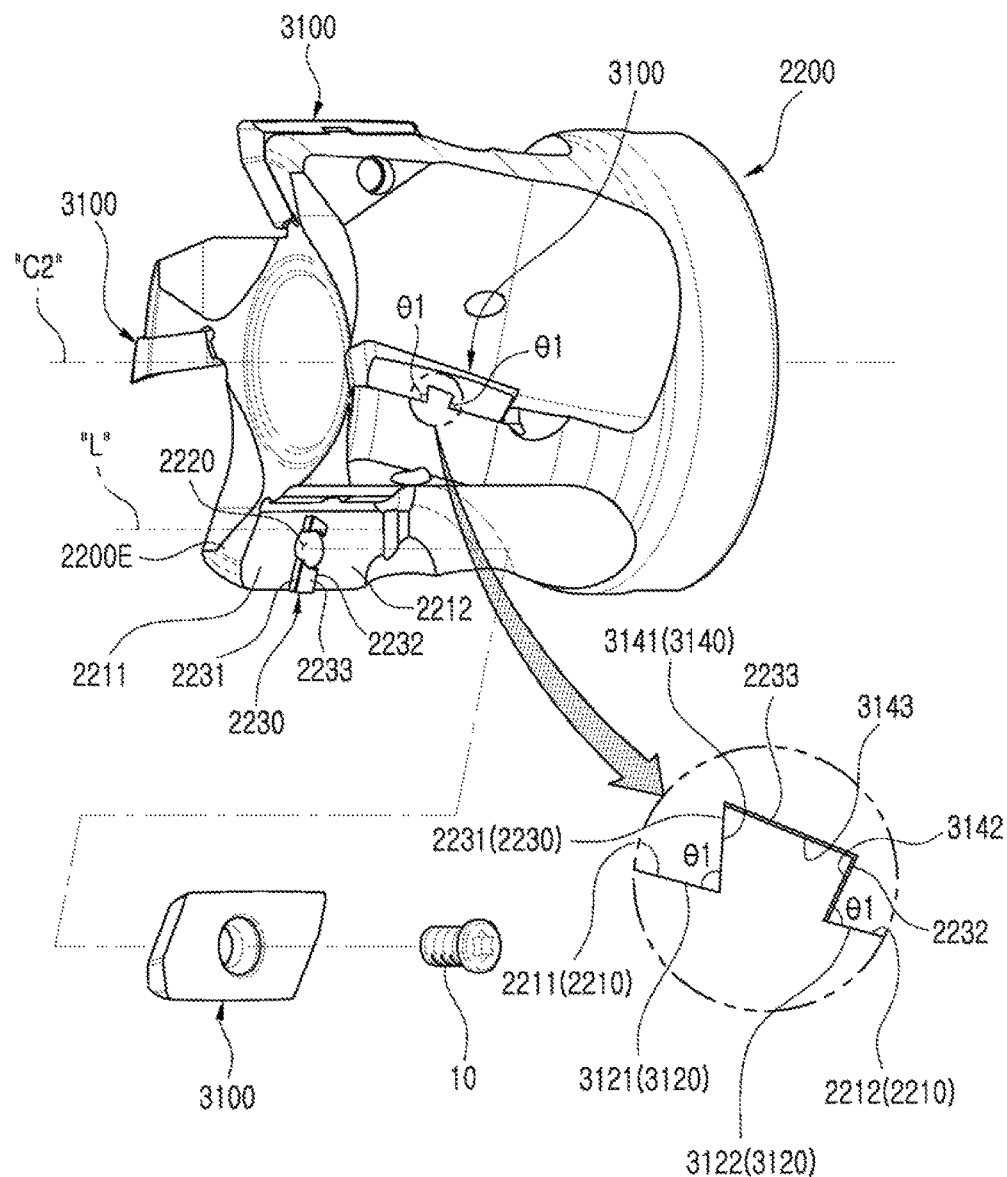
FIG. 15 is a perspective view schematically illustrating a cutting tool having the cutting insert of FIG. 13 mounted thereon.

FIG. 15 is a perspective view schematically illustrating a cutting tool having the cutting insert of FIG. 13 mounted thereon.

As shown in FIG. 15, since the cutting tool 2200 according to another embodiment of the disclosure is the same as the cutting tool 200 according to the embodiment of the present disclosure described above except that one protrusion 2230 is disposed, the following discussions will be focused mainly on the protrusion 2230.

As shown in FIG. 15, the protrusion 2230 protrudes from the seat surface 2210 and inserted into the long groove 3140 of the cutting insert 3100 described above according to the third embodiment of the present disclosure described above. As shown in FIG. 15, the protrusion 2230 may include a first surface 2231, a second surface 2232, and an upper surface 2233. The first surface 2231 adjoins the first adjacent seat portion 2211 of the seat surface 2210 and makes an acute angle θ1 with the first adjacent seat portion 2211 of the seat surface 2210, the second surface 2232 adjoins the second adjacent seat portion 2212 of the seat surface 2210 and makes an acute angle θ1 with the second adjacent seat portion 2212 of the seat surface 2210, and the upper surface 2233 connects the first surface 2231 and the second surface 2232. Specifically, the first and second surfaces 2231, 2232 may be in a bilateral symmetry with each other with respect to the center of the screw fastening hole 2220.

Further, the first surface 2231 may be placed closer to the end 2200E of the cutting tool 2200 than the second surface 2232 is placed to the end 2200E of the cutting tool 2200. In addition, one end of the first surface 2231 may be placed in the seat surface 2210 at a farthest distance away from the rotational axis C2 of the cutting tool 2200, and the other end of the first surface 2231 may be between an imaginary line L and the portion in the seat surface 210 that is closest to the rotational axis C2. The 'imaginary line L' herein may refer to an imaginary line that is passed through an edge of the screw fastening hole 2220 closest to the rotational axis C2 and that is parallel to the rotational axis C2.

The first sidewall 3141 of the cutting insert 3100 according to the third embodiment of the present disclosure described above may be located to be closer to the end 2200E of the cutting tool than the second sidewall 3142 is located to the end 2200E of the cutting tool, and although not shown, the first surface 2231 may be in contact with the first sidewall 3141 of the long groove 3140 of the cutting insert 3100 described above according to the third embodiment of the disclosure during the cutting process.

Hereinafter, the cutting insert according to a fourth embodiment of the present disclosure will be described with reference to FIGS. 16 and 17.

Figure 16:
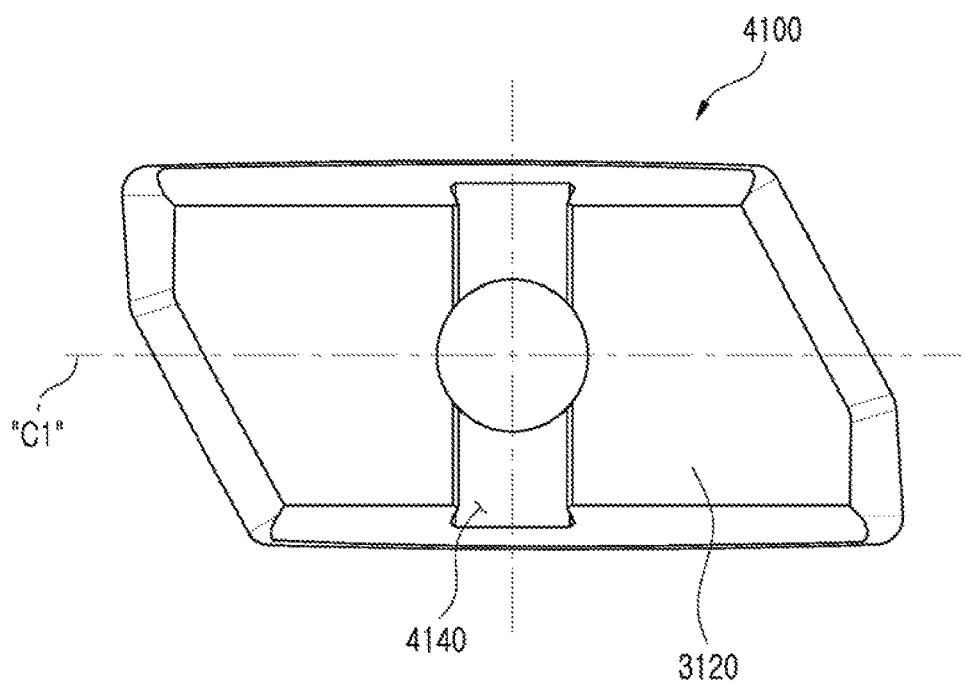
FIG. 16 is a bottom view schematically illustrating a cutting insert according to a fourth embodiment of the present disclosure.
Figure 17:
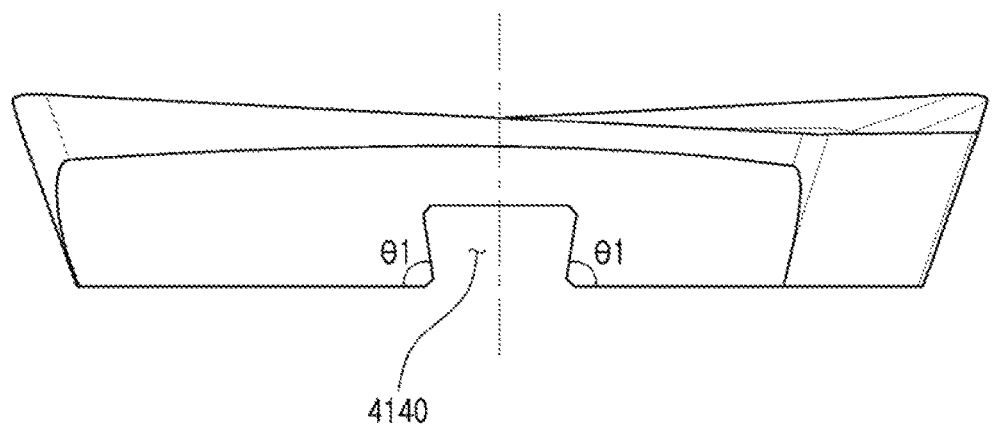
FIG. 17 is a side view of the cutting insert of FIG. 16 viewed in a longitudinal direction of the long groove.

FIG. 16 is a bottom view schematically illustrating a cutting insert according to the fourth embodiment of the present disclosure, and FIG. 17 is a side view of the cutting insert of FIG. 16 viewed in a longitudinal direction of the long groove.

As shown in FIGS. 16 and 17, the cutting insert 4100 according to the fourth embodiment of the present disclosure is the same as the third embodiment of the present disclosure described above except for a form in which the long groove 4140 is disposed, the following discussions will be focused mainly on the form in which the long groove 4140 is disposed.

As shown in FIG. 16, the long groove 4140 may be perpendicular to the longitudinal centerline C1 of the fastening surface 120.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present invention relates to a cutting insert and a cutting tool having the same mounted thereon and can be applied to cutting a workpiece, which is industrially applicable.

What is claimed is:

1. A cutting insert, comprising:
a principal surface;
a fastening surface opposite to the principal surface, the fastening surface being placed on the seat surface of a cutting tool;
a screw passage hole formed through each of central portions of the principal and fastening surfaces, wherein a screw is fastened to the cutting tool through the screw passage hole; and
first and second long grooves extending across the fastening surface, wherein each of the first and second long grooves comprises:
a proximal sidewall adjoining a first adjacent fastening portion of the fastening surface and making an acute angle with the first adjacent fastening portion;
a distal sidewall adjoining a second adjacent fastening portion of the fastening surface and making an angle with the second adjacent fastening portion; and
a ceiling wall connecting the proximal sidewall and the distal sidewall, wherein the proximal sidewall is located to be closer to the screw passage hole than the distal sidewall is located to the screw passage hole.

2. The cutting insert of claim 1, wherein the first and second long grooves are parallel to each other.

3. The cutting insert of claim 2, further comprising first and second long side surfaces and first and second short side surfaces connecting the principal surface and the fastening surface,
wherein the first and second long side surfaces are opposed to each other, and the first and second short side surfaces are opposed to each other, and
wherein each of the first and second long grooves is formed in a manner such that one end thereof is exposed to the first long side surface, and the other end thereof is exposed to second long side surface.

4. The cutting insert of claim 3, wherein each of the first and second long grooves is inclined with respect to a longitudinal centerline of the fastening surface.

5. The cutting insert of claim 3, wherein each of the first and second long grooves is perpendicular to a longitudinal centerline of the fastening surface.

6. A cutting tool having the cutting insert of claim 1 mounted thereon, the cutting tool comprising:
a seat surface on which the fastening surface is placed;
a screw fastening hole formed on the seat surface and through which the screw is fastened; and
a front protrusion and a rear protrusion protruding from the seat surface and being inserted into the first and second long grooves, respectively,
wherein each of the front protrusion and the rear protrusion comprises:
a front surface contacting a first adjacent seat portion of the seat surface and making an angle with the first adjacent seat portion;
a rear surface contacting a second adjacent seat portion of the seat surface and making an acute angle with the second adjacent seat portion; and
an upper surface connecting the front and rear surfaces, wherein the rear surface is located to be closer to the screw fastening hole than the front surface is located to the screw fastening hole.

7. The cutting tool of claim 6, wherein the rear protrusion is located farther away from an end of the cutting tool than the front protrusion is located away from the end of the cutting tool,
one end of the rear surface of the rear protrusion is at a farthest distance in the seat surface away from a rotational axis of the cutting tool, and the other end thereof is between an imaginary line and a portion in the seat surface that is closest to the rotational axis, and
the imaginary line is passed through an edge of the screw fastening hole that is closest to the rotational axis, and is parallel to the rotational axis.

8. The cutting tool of claim 7, wherein the rear surface of the rear protrusion is in contact with the proximal sidewall of the second long groove of the cutting insert during the cutting process.

9. A cutting insert, comprising:
a principal surface;
a fastening surface opposite to the principal surface, the fastening surface for fastening with a seat surface of a cutting tool;
a screw passage hole formed through each of central portions of the principal and fastening surfaces, wherein a screw is fastened to the cutting tool through the screw passage hole for fastening with the cutting tool; and
a long groove elongated across the fastening surface, wherein the long groove comprises:
a first sidewall adjoining a first adjacent fastening portion of the fastening surface and making an acute angle with the first adjacent fastening portion;
a second sidewall adjoining a second adjacent fastening portion of the fastening surface and making an acute angle with the second adjacent fastening portion; and
a ceiling wall connecting the first sidewall and the second sidewall, wherein a center of the long groove is placed in the screw passage hole.

10. The cutting insert of claim 9, further comprising first and second long side surfaces and first and second short side surfaces connecting the principal surface and the fastening surface, wherein the first and second long side surfaces are opposed to each other, and the first and second short side surfaces are opposed to each other, and
one end of the long groove is exposed to the first long side surface and the other end thereof is exposed to second long side surface, and
the long groove is inclined to the longitudinal centerline of the fastening surface.

11. The cutting insert of claim 9, further comprising first and second long side surfaces and first and second short side surfaces connecting the principal surface and the fastening surface,
wherein the first and second long side surfaces are opposed to each other, and the first and second short side surfaces are opposed to each other, and
one end of the long groove is exposed to the first long side surface and the other end thereof is exposed to the second long side surface, and the long groove is perpendicular to a longitudinal centerline of the fastening surface.

12. A cutting tool having the cutting insert of claim 9 mounted thereon, the cutting tool comprising:
a seat surface on which the fastening surface is placed;
a screw fastening hole formed on the seat surface; and
a protrusion protruding from the seat surface and being inserted into the long groove, wherein the protrusion comprises:
a first surface adjoining a first adjacent seat portion of the seat surface and making an acute angle with the first adjacent seat portion;
a second surface adjoining a second adjacent seat portion of the seat surface and making an acute angle with the second adjacent seat portion; and
an upper surface connecting the first and second surfaces, wherein the first and second surfaces are in a bilateral symmetry with each other with respect to a center of the screw fastening hole.

13. The cutting tool of claim 12, wherein the first surface is placed closer to an end of the cutting tool than the second surface is placed to an end of the cutting tool,
one end of the first surface is at a farthest distance in the seat surface away from a rotational axis of the cutting tool, and the other end thereof is between an imaginary line and a portion in the seat surface that is closest to the rotational axis, and
the imaginary line is passed through an edge of the screw fastening hole that is closest to the rotational axis, and is parallel to the rotational axis.

14. The cutting tool of claim 13, wherein the first sidewall is located closer to the end of the cutting tool than the second sidewall is located to the end of the cutting tool, and
the first surface is in contact with the first sidewall of the long groove of the cutting insert during cutting process.

15. A cutting tool, comprising:
a seat surface on which a fastening surface of a cutting insert is placed;
a screw fastening hole formed on the seat surface and through which a screw is screwed; and
a protrusion protruding from the seat surface, wherein the protrusion comprises:
a first surface making an angle with respect to the seat surface;
a second surface making an angle with respect to the seat surface; and
an upper surface connecting the first and second surfaces, wherein
the first surface is placed closer to an end of the cutting tool than the second surface is placed to the end of the cutting tool,
one end of the first surface is at a farthest distance in the seat surface away from a rotational axis of the cutting tool, and the other end thereof is between an imaginary line and a portion in the seat surface that is closest to the rotational axis, and
the imaginary line is passed through an edge of the screw fastening hole that is closest to the rotational axis, and is parallel to the rotational axis.

16. A cutting tool having the cutting insert of claim 2 mounted thereon, the cutting tool comprising:
a seat surface on which the fastening surface is placed;
a screw fastening hole formed on the seat surface and through which the screw is fastened; and
a front protrusion and a rear protrusion protruding from the seat surface and being inserted into the first and second long grooves, respectively,
wherein each of the front protrusion and the rear protrusion comprises:
a front surface contacting a first adjacent seat portion of the seat surface and making an angle with the first adjacent seat portion;
a rear surface contacting a second adjacent seat portion of the seat surface and making an acute angle with the second adjacent seat portion; and
an upper surface connecting the front and rear surfaces, wherein the rear surface is located to be closer to the screw fastening hole than the front surface is located to the screw fastening hole.

17. A cutting tool having the cutting insert of claim 3 mounted thereon, the cutting tool comprising:
a seat surface on which the fastening surface is placed;
a screw fastening hole formed on the seat surface and through which the screw is fastened; and a front protrusion and a rear protrusion protruding from the seat surface and being inserted into the first and second long grooves, respectively, wherein each of the front protrusion and the rear protrusion comprises:

a front surface contacting a first adjacent seat portion of the seat surface and making an angle with the first adjacent seat portion;

a rear surface contacting a second adjacent seat portion of the seat surface and making an acute angle with the second adjacent seat portion; and an upper surface connecting the front and rear surfaces, wherein the rear surface is located to be closer to the screw fastening hole than the front surface is located to the screw fastening hole.

18. A cutting tool having the cutting insert of claim 4 mounted thereon, the cutting tool comprising:

a seat surface on which the fastening surface is placed;

a screw fastening hole formed on the seat surface and through which the screw is fastened; and a front protrusion and a rear protrusion protruding from the seat surface and being inserted into the first and second long grooves, respectively, wherein each of the front protrusion and the rear protrusion comprises:

a front surface contacting a first adjacent seat portion of the seat surface and making an angle with the first adjacent seat portion;

a rear surface contacting a second adjacent seat portion of the seat surface and making an acute angle with the second adjacent seat portion; and an upper surface connecting the front and rear surfaces, wherein the rear surface is located to be closer to the screw fastening hole than the front surface is located to the screw fastening hole.

19. A cutting tool having the cutting insert of claim 5 mounted thereon, the cutting tool comprising:

a seat surface on which the fastening surface is placed;

a screw fastening hole formed on the seat surface and through which the screw is fastened; and a front protrusion and a rear protrusion protruding from the seat surface and being inserted into the first and second long grooves, respectively, wherein each of the front protrusion and the rear protrusion comprises:

a front surface contacting a first adjacent seat portion of the seat surface and making an angle with the first adjacent seat portion;

a rear surface contacting a second adjacent seat portion of the seat surface and making an acute angle with the second adjacent seat portion; and an upper surface connecting the front and rear surfaces, wherein the rear surface is located to be closer to the screw fastening hole than the front surface is located to the screw fastening hole.

20. A cutting tool having the cutting insert of claim 10 mounted thereon, the cutting tool comprising:

a seat surface on which the fastening surface is placed;

a screw fastening hole formed on the seat surface; and a protrusion protruding from the seat surface and being inserted into the long groove, wherein the protrusion comprises:

a first surface adjoining a first adjacent seat portion of the seat surface and making an acute angle with the first adjacent seat portion;

a second surface adjoining a second adjacent seat portion of the seat surface and making an acute angle with the second adjacent seat portion; and an upper surface connecting the first and second surfaces, wherein the first and second surfaces are in a bilateral symmetry with each other with respect to a center of the screw fastening hole.

* * * * *